United States Patent
Leitow et al.

(10) Patent No.: US 10,018,770 B2
(45) Date of Patent: Jul. 10, 2018

(54) LIGHTING DEVICE FOR VEHICLES

(71) Applicant: Hella KGaA Hueck & Co., Lippstadt (DE)

(72) Inventors: Marc Leitow, Lippstadt (DE); Paula Madrid Fernandez, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 178 days.

(21) Appl. No.: 14/779,051

(22) PCT Filed: May 6, 2014

(86) PCT No.: PCT/EP2014/059170
§ 371 (c)(1),
(2) Date: Sep. 22, 2015

(87) PCT Pub. No.: WO2014/180813
PCT Pub. Date: Nov. 13, 2014

(65) Prior Publication Data
US 2016/0062031 A1    Mar. 3, 2016

(30) Foreign Application Priority Data

May 6, 2013 (DE) .......................... 10 2013 104 590

(51) Int. Cl.
F21V 7/04 (2006.01)
F21V 8/00 (2006.01)
(Continued)

(52) U.S. Cl.
CPC .......... *G02B 6/0068* (2013.01); *B60C 1/0041* (2013.01); *B60Q 1/18* (2013.01);
(Continued)

(58) Field of Classification Search
CPC ..... B60Q 1/0041; B60Q 1/18; F21S 48/1241; F21S 48/211; F21S 48/2225
(Continued)

(56) References Cited

U.S. PATENT DOCUMENTS

| 7,946,743 | B2* | 5/2011 | Natsume | .............. B60Q 1/0041 362/509 |
| 2013/0010488 | A1* | 1/2013 | Koizumi | .............. F21S 48/1154 362/517 |

FOREIGN PATENT DOCUMENTS

| DE | 10065020 | 3/2002 |
| DE | 102 05 048 | 8/2003 |

(Continued)

Primary Examiner — Bao Q Truong
Assistant Examiner — Matthew Peerce
(74) Attorney, Agent, or Firm — Husch Blackwell LLP

(57) ABSTRACT

A lighting device having a first lighting unit comprising a first light source and a first optics element, disposed upstream thereof in the main beam direction, for generating a first lighting function. The lighting device also has a second light source and a second optics element, disposed upstream thereof in the main beam direction, for generating a second lighting function. The first optics element, disposed in front of the first light source in the main beam direction, is designed as a flat waveguide having a narrow-side light intake surface, having a narrow-side light output surface, and having opposing flat sides connecting the light intake surface and the light output surface. The light intake surface of the flat waveguide is disposed at such a spacing to the first light source that a lateral light beam emitted by the first light source strikes the second optics element in order to illuminate said optics element.

6 Claims, 1 Drawing Sheet

(51) Int. Cl.
*B60C 1/00* (2006.01)
*B60Q 1/18* (2006.01)
*F21S 41/143* (2018.01)
*F21S 41/24* (2018.01)
*F21S 41/25* (2018.01)
*F21S 43/14* (2018.01)
*F21S 43/239* (2018.01)
*F21S 43/243* (2018.01)

(52) U.S. Cl.
CPC ............ *F21S 41/143* (2018.01); *F21S 41/24* (2018.01); *F21S 41/25* (2018.01); *F21S 43/14* (2018.01); *F21S 43/239* (2018.01); *F21S 43/243* (2018.01); *G02B 6/005* (2013.01); *B60Q 2400/30* (2013.01)

(58) Field of Classification Search
USPC .......................................................... 362/613
See application file for complete search history.

(56) References Cited

FOREIGN PATENT DOCUMENTS

| | | | |
|---|---|---|---|
| DE | 10205776 | 9/2003 | |
| DE | 102006046168 | 4/2008 | |
| DE | 10065020 B4 * | 2/2009 | ........... B60Q 1/0041 |
| DE | 10 2010 0007 809 | 8/2011 | |
| EP | 1 801 492 | 6/2007 | |
| JP | 2003257222 | 9/2003 | |
| JP | 2003257222 A * | 9/2003 | |
| JP | 2006049323 | 2/2006 | |
| JP | 2007280689 | 10/2007 | |
| JP | 2009152057 | 7/2009 | |

\* cited by examiner

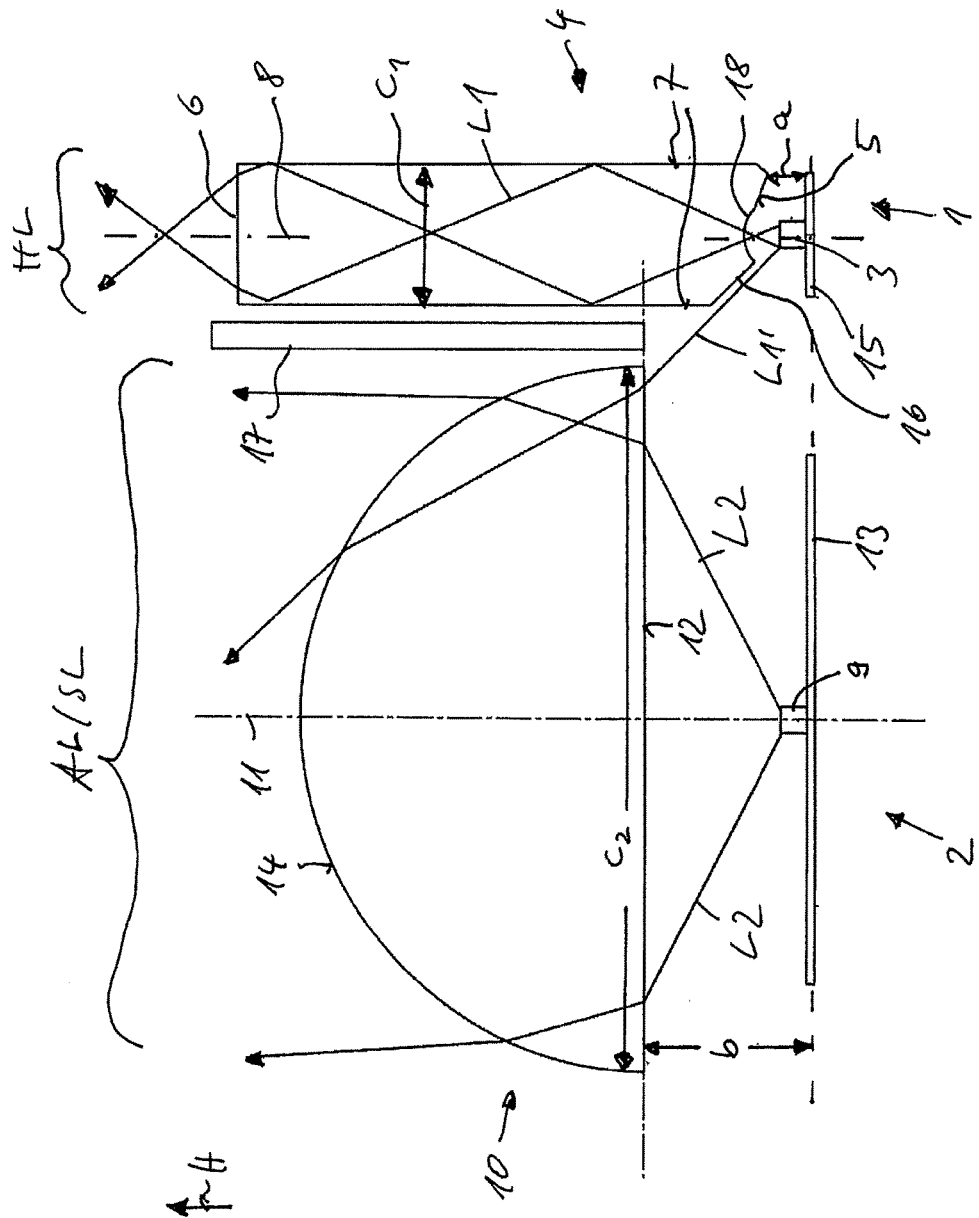

LIGHTING DEVICE FOR VEHICLES

CROSS REFERENCE

This application claims priority to International Application No. PCT/EP2014/059170, filed on May 6, 2014, which itself claims priority to German Application No. 10 2013 104590.1, filed May 6, 2013, both of which are hereby incorporated by reference.

FIELD OF TECHNOLOGY

The invention relates to a lighting device for vehicles having a first lighting unit comprising a first light source and a first optics element, disposed upstream thereof in the main beam direction, for generating a first lighting function, and having a second lighting unit comprising a second a second light source and a second optics element, disposed upstream thereof in the main beam direction, for generating a second lighting function.

BACKGROUND

A lighting device for vehicles is known form DE 102 05 048 A1 having at least two lighting units with different lighting functions. A first lighting unit has a light source as well as an optics element having a curved lateral surface, such that a light bundle is emitted at a relatively large angle to the side, in order to generate a cornering light function. A second lighting unit is provided adjacent to this first lighting unit, having a light source and a reflector as the second optics element, which serves to generate a turn signal light function. The known lighting device enables a space-saving arrangement of numerous lighting units.

In order to generate a daytime running lamp function, flat waveguides are currently used as an optics element disposed upstream of a light source, wherein the flat waveguides have a narrow light intake surface and a narrow light output surface. Opposing flat sides extend between the light intake surface and the light output surface, at which an entering light is conducted toward the light output surface through total internal reflection. The disadvantage with such a daytime running light lighting unit is that the flat waveguides must have a relatively long design due to the narrow light output surface in order to fulfill the legal requirements regarding the minimum lighting area for the lighting function.

SUMMARY OF THE INVENTION

The object of the present invention is thus to further develop a lighting device for vehicles such that the lighting surface of a lighting unit is enlarged in a simple manner, while saving space.

In order to achieve this object, the invention may be characterized in that the first optics element disposed in the main beam direction in front of the first light source is designed as a flat waveguide having a narrow-side light intake surface, having a narrow-side light output surface, and having opposing flat sides connecting the light intake surface and the light output surface, and in that the light intake surface of the flat waveguide is disposed at such a spacing to the first light source that a lateral light beam emitted by the first light source strikes the second optics element in order to illuminate said optics element.

The particular advantage of the invention is that, in a space saving manner, an optics element of an adjacent second lighting unit is used for the illumination of a first lighting unit. A light source allocated to the optics element of the first lighting unit can emit a sub-light beam laterally, such that it does not strike the first optics element, but rather, it strikes a second optics element of the adjacent second lighting unit. If the second lighting unit is in a standby mode, the second optics element is illuminated by laterally emitted sub-light beam (lateral light beam) from the first light source, and can serve to increase the illumination area of the actual first lighting unit. According to the invention, a main light beam enters the first optics element disposed upstream of the first light source and a lateral light beam enters the second optics element allocated to the second lighting unit.

According to a preferred embodiment of the invention, the second optics element is disposed at such a spacing to the second light source of the second lighting unit that the lateral light beam of the first light source strikes a light entry surface of the second optics element. The angle of incidence for the light of the lateral light beam on the light entry surface of the second optics element can be relatively large. It is sufficient when the second optics element also provides illumination, without using light beams for lighting the area in front thereof. The illumination of the second optics element is just great enough that a lighting of the immediate surroundings originates therefrom, which can be detected with light meters, and which fulfills the legal requirements regarding the minimal illumination area for the first lighting function.

According to a further development of the invention, the first optics element has a flat area on a surface facing the second optics element, such that a light path to the second optics element is made available for the lateral light beam. Advantageously, this results in a branching off of a lateral light beam in a simple manner, wherein a main light beam enters the first optics element, and is emitted at the light output surface thereof in accordance with a predefined light distribution.

According to a further development of the invention, an optical separating wall is disposed between the first optics element and the second optics element, such that there is no coupling, or interaction between the first optics element and the second optics element in a region between the light entry surface and the light exit surface.

According to a further development of the invention, the second optics element is designed as a lens, which emits a main light function as the lighting function in interacting with the second light source, such as a low beam function, for example. When the first lighting function is used as a secondary lighting function, this results in a convenient functional linkage, in which the second optics element exhibits a double function. When the second light source is switched on, and the first light source is switched off, it serves to generate the main lighting function. When the second light source is switched off and the first light source is switched on, it serves to generate the secondary lighting function.

According to a further development of the invention, the second optics element has a lateral extension perpendicular to the separating wall, which is at least three times as great as a lateral extension of the flat waveguide. In this manner it is ensured that a sufficiently large illumination area is provided for the first lighting function.

According to a further development of the invention, the first light source and the second light source are disposed on a common plane of extension. By way of example, the two light sources can be disposed on a shared printed circuit board, thus reducing costs.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 shows a schematic top view of a lighting device according to the invention.

DETAILED DESCRIPTION OF THE DRAWINGS

A lighting device according to the invention can be used in a front or rear region of a vehicle. In the present exemplary embodiment, the lighting device has a first lighting unit 1 as well as a second lighting unit 2 disposed in a housing (not shown). The lighting device is mounted as a headlamp in the front region of the vehicle.

The first lighting unit 1 serves to generate a secondary lighting function, e.g. a daytime running lights function, and has at least one light emitting diode (LED) as the first light source 3. The LED light source 3 is disposed upstream of a first optics element 4 in the main beam direction H, which optics element is designed as a flat waveguide. The flat waveguide 4 has a narrow design in the main beam direction H. It has a narrow-side light intake surface 5 on a side facing the first light source 3, and has a light output surface 6 on a side facing away from the first light source 3. Opposing flat sides 7 having relatively large dimensions extend between the light intake surface 5 and the light output surface 6, at which light beams L1 of a main light beam HL emitted from the first light source 3 are conducted through total internal reflection toward the light output surface 6.

A longitudinal central plane 8 of the first lighting unit 1 runs parallel to the flat sides 7 of the flat waveguide 4. The main beam direction H of the first lighting unit 1 runs in the longitudinal central plane 8.

The second lighting unit 2 is disposed, at a spacing along a norm of the flat sides 7, adjacent to the first lighting unit 1, having a second light source 9 and a second optics element disposed in front of the second light source 9 in the main beam direction H. The second light source 9 is designed—like the first light source 3—as an LED light source. The second optics element 10 is designed as a lens, preferably a plano-convex lens. The plan-convex lens 10 is disposed such that it is not rotationally symmetrical to an optical axis 11 of the second lighting unit 2. The lens 10 has a flat light entry surface 12, which is disposed at an axial spacing b to the second light source 9, or a printed circuit board 13 on which the second light source 9 is mounted. Alternatively, the light entry surface 12 can also be designed with a convex or concave shape. A convex light exit surface 14 runs on a side of the lens 10 facing away from the second light source 9, which is struck by light beams L2 emitted by the second light source 9 for generating a main lighting function, e.g. a low beam lighting function, in the main beam direction H, which is subjected to refraction. The light output surface 15 is designed as a freeform surface, which can, for example, exhibit optics elements.

The lens 10 has a transverse extension $c_2$, which is at least three times as great as a transverse extension $c_1$ of the flat waveguide 4.

Preferably numerous LED light sources 3 are provided as the first light sources 3 for the first lighting unit 1, which extend perpendicular to the plane of the drawing at a predefined spacing on a narrow printed circuit board 15. The length of the printed circuit board 15 corresponds to a length of the flat waveguide 4. The length of the flat waveguide 4 running perpendicular to the plane of the drawing is not sufficient to exceed the dimensions of the light output surface of the predefined minimum illumination area pursuant to the ECE regulation of 25 $cm^2$.

In order to achieve the minimum illumination area for the first lighting unit 1 when generating a daytime running lights lighting function, the first optics element 4 has a flat area on a side facing the adjacent second optics element 10, such that a lateral light beam SL emitted by the first light source 3 is emitted, or branched off, respectively, with light beams L1' toward the second optics element 10. Preferably the light beams L1' strike the light entry surface 12 of the second optics element 10.

A spacing between the light intake surface 5 of the flat waveguide 4 and the first light source 3, or the printed circuit board 15, respectively, is selected such that preferably the lateral light beam SL strikes the second optics element 10, through the use of the flat area 16, and an illumination thereof toward the main beam direction H is obtained. The portion of the lateral light beam SL to the overall light beam emitted by the first light source 3 can be small enough that the lens 10 is illuminated in an ambient manner, without the participation of the lateral light beam SL for generating a light distribution. To an observer, an illumination area appears having dimensions corresponding to the projection of the light exit surface 14 of the lens 10 in relation to a plane running perpendicular to the main beam direction H.

In order to generate a daytime running lights lighting function, only the first light source 3 is switched on, while the second light source 9 remains off. In this operating state, a strong light intensity of the main light distribution HL is emitted by means of the first optics element 4 and a weak light intensity of the lateral light distribution SL is emitted by means of the second optics element 10 in the main beam direction H.

In order to generate the main light distribution, the first light source 3 is switched off, while the second light source 9 is switched on. The main light distribution AL is emitted solely via the second optics element 10.

In order to prevent an interaction of the two lighting functions "main light" and "secondary light," a separating wall 17 is disposed between the first lighting unit 1 and the second lighting unit 2, this wall being opaque in design. The separating wall 17 extends in a region between the light entry surface 12 of the second optics element 10 up to a light output surface 6 of the first optics element 4, preferably beyond the light output surface 6.

The first light sources 3 as well as the second light source 9 are positioned in a common plane of extension E, which runs perpendicular to the main beam direction H. By way of example, the first light sources 3 and the second light source 9 can be disposed on a shared printed circuit board. Alternatively, the light sources 3, 9 can also be disposed in different planes of extension, such that they are offset in the main beam direction (H).

According to an alternative embodiment of the invention, not shown herein, more than two lighting units can also be disposed adjacent to one another, wherein a lateral light beam is branched off from at least one lighting unit, in at least one direction.

In the present exemplary embodiment, the light intake surface 5 of the first optics element 4 has a channeling 18 allocated, respectively, to the first light sources, for an improved introduction of light into the flat waveguides 5.

The optics elements 4, 10 are made from a transparent material, preferably a transparent plastic.

LIST OF REFERENCE SYMBOLS 1 first lighting unit
2 second lighting unit
3 first light source
4 first optics element
5 light intake surface
6 light output surface
7 flat surface
8 longitudinal central plane
9 second light source
10 second optics element
11 optical axis
12 light entry surface
13 printed circuit board
14 light exit surface
15 printed circuit board
16 flat area
17 separating wall
18 channeling
H main beam direction
E direction of extension
L1, L1', L2 light beams
HL main light beam
SL lateral light beam
$c_2$, $c_1$ transverse extension
a spacing
b axial spacing
AL low beam light distribution

The invention claimed is:

1. A lighting device comprising:
  a first lighting unit including:
    a first optics element; and
    a first light source disposed upstream of the first optics element in a main beam direction, said first light source for generating a first lighting function;
  a second lighting unit including:
    a second optics element; and
    a second light source coplanar with the first light source and disposed upstream of the second optics element in the main beam direction, said second light source for generating a second lighting function,
  wherein the first optics element is designed as a flat waveguide having a light intake surface, a light output surface, and opposing flat surfaces connecting the light intake surface and the light output surface,
  wherein the light intake surface of the flat waveguide is disposed at such a spacing to the first light source that at least some light emitted by the first light source, embodied as a lateral light beam, directly strikes the second optics element without striking the first optics element in order to illuminate said second optics element, and
  wherein a separating wall is disposed between the first optics element and the second optics element.

2. The lighting device according to claim 1 wherein the first optics element has a flat area on a side facing the second optics element between one of the opposing flat surfaces and the light intake surface in order to make the light path to the second optics element available.

3. The lighting device according to claim 1 wherein the second optics element is designed as a lens, by means of which a main light function (AL) can be emitted when the second light source is switched on.

4. The lighting device according to claim 1 wherein the second optics element has a transverse extension ($c2$) perpendicular to the separating wall, which is at least three times as large as a transverse extension ($c1$) of the flat waveguide.

5. The lighting device according to claim 1 wherein the first light source is activated such that the first lighting unit emits a secondary lighting function.

6. The lighting device according to claim 1 wherein the first lighting unit and the second lighting unit are disposed in a shared housing.

* * * * *